United States Patent
Qian et al.

(10) Patent No.: US 6,944,470 B2
(45) Date of Patent: Sep. 13, 2005

(54) METHOD AND SYSTEM FOR CLOSED LOOP POWER CONTROL IN WIRELESS SYSTEMS

(76) Inventors: Lijun Qian, 235 Main St., Apt. 118, S. Bound Brook, NJ (US) 08880; Zoran Gajic, 414 Lancaster Ct., Piscataway, NJ (US) 08854

( * ) Notice: Subject to any disclaimer, the term of this patent is extended or adjusted under 35 U.S.C. 154(b) by 2 days.

(21) Appl. No.: 10/240,924

(22) PCT Filed: Apr. 6, 2001

(86) PCT No.: PCT/US01/40465

§ 371 (c)(1),
(2), (4) Date: Mar. 7, 2003

(87) PCT Pub. No.: WO01/78250

PCT Pub. Date: Oct. 18, 2001

(65) Prior Publication Data

US 2003/0166407 A1 Sep. 4, 2003

Related U.S. Application Data

(60) Provisional application No. 60/194,879, filed on Apr. 6, 2000.

(51) Int. Cl.$^7$ .............................. H04B 7/00; H04Q 7/20
(52) U.S. Cl. ................... 455/522; 455/63.1; 455/67.11; 455/69
(58) Field of Search .............................. 455/63.1, 67.11, 455/69, 226.1, 226.2, 522; 370/318, 320, 342

(56) References Cited

U.S. PATENT DOCUMENTS

| | | | |
|---|---|---|---|
| 5,412,686 A | * 5/1995 | Ling | 455/226.2 |
| 5,839,056 A | 11/1998 | Hakkinen | 455/69 |
| 5,864,547 A | 1/1999 | Strodtbeck et al. | 370/318 |
| 5,956,649 A | 9/1999 | Mitra et al. | 455/522 |
| 6,070,086 A | 5/2000 | Dobrica | 455/522 |
| 6,101,179 A | 8/2000 | Soliman | 370/342 |
| 6,137,788 A | * 10/2000 | Sawahashi et al. | 370/342 |
| 6,343,206 B1 | * 1/2002 | Miya et al. | 455/69 |
| 6,600,772 B1 | * 7/2003 | Zeira et al. | 455/522 |

OTHER PUBLICATIONS

G.J. Foschini and Z. Mijanic, "A Simple Distributed Autonomous Power Control Algorithm and its Covergence," IEEE, Trans. Vehic. Tech, vol. 42, No. 4, pp. 641–646, Nov. 1993.
S. Grandhi, J. Zander and R. Yates, "Constrained Power Control" Wireless Personal Communications, vol. 1, pp. 257–270, 1995.
Sudheer, A et al., "Distributed Power Control in Cellular Radio Systems", IEEE Transactions on Communications, vol. 42, No. 2/3/4, Feb./Mar./Apr. 1994.
Grandhi et al., "Centralized Power Control in Cellular Radio System", IEEE Trans, Veh. Technol., vol. 42, No. 4, pp. 466–468, Nov. 1993.
Zander, J., "Distributed Cochannel Interference Control in Cellular Radio Systems", IEEE Trans. Veh. Technol., vol., 41pp. 305–311, Aug. 1992.
Zander, J., "Performance of Optimum Transmitter Power Control in Cellular Radio Systems", IEEE Trans. Veh. Technol., vol. 41, pp. 57–62, Feb. 1992.
G. Stuber "Principles of mobile Communication", Aluwer Academic Publishers, Table of Contents, 1996.
S.V. Henly, "Capacity in a Two–Cell Special Spectrum Network", 30th Annual Conference in Communication, Control and Computing, Allerton House, Monticello, Ill., pp. 426–435, 1992.

* cited by examiner

Primary Examiner—Quochien B. Vuong
(74) Attorney, Agent, or Firm—Mathews, Shepherd, McKay & Bruneau, P.A.

(57) ABSTRACT

A system for closed loop power control in a mobile communication system comprises error determination process for determining an error between a target SIR and a received SIR (12, 14) and a power control scheme for determining a power change associated with error (18). As a result, the system controls the gain of power transmission (19) in order to achieve minimum error at a subsequent time instant.

18 Claims, 11 Drawing Sheets

METHOD AND SYSTEM FOR CLOSED LOOP POWER CONTROL IN WIRELESS SYSTEMS

This application is the national stage of PCT/US01/40465 filed Apr. 6, 2001 and claims the benefit of provisional application 60/194,879 filed Apr. 6, 2000.

BACKGROUND OF THE INVENTION

1. Field of the Invention

The invention relates to the area of power control in wireless systems and more particularly the present invention relates to a method and system for providing closed loop power control in narrow band or spread spectrum wireless systems.

2. Description of the Related Art

In the field of wireless communications, several technologies exist for controlling communications between a mobile station, such as a cellular telephone or personal communication system (PCS) handset, and a wireless base station. In a narrow band wireless network, time and frequency slots are partitioned in order to avoid material interference between users. Users can share the same time or frequency slot provided they are sufficiently far apart and such users are known as co-channel users. The issue of power control arises because the co-channel users interfere with each other. Carrier/Interference (C/I) balancing schemes have been described in which C/I is balanced to provide a distribution of the interference such that all users have the same C/I or have the same carrier to interference ratio (CIR), i.e. the ratio of the power level of a desired signal received at a given location to the power level of all other received signals of the given location, or signal-to-interference ratio SIR, see Zander, "Performance of optimum transmitter power control in cellular radio systems," IEEE Trans. Veh. Technol., Vol. 41, pp. 57–62, February 1992; and, "Distributed Cochannel Interference Control in Cellular Radio Systems," IEEE Trans. Veh. Technol., Vol. 41, pp. 305–311, August 1992; and Grandhi et al., "Centralized Power Control In Cellular Radio Systems," IEEE Trans. Veh. Technol., Vol. 42, No. 4, pp. 466–468, November 1993; and, "Distributed Power Control In Cellular Radio Systems," IEEE Trans. Comm., Vol. 42, No. 2/3/4, pp. 226–228, February/March/April 1994.

In code division multiple access (CDMA) systems, users share the same frequency all the time by using a specific spread spectrum pseudonoise code for each user. Fundamental to the CDMA system is power control. The CDMA system is an interference limited system in the sense that the system capacity, related to the number of simultaneous calls, is a function of the maximum amount of interference that the system can tolerate. In order to maximize the system capacity, the transmitted power of each mobile unit is controlled so that its signal arrives at the cell site with the minimum allowable SIR. Power control is used to mitigate the "near/far problem" preventing users that are geographically closer to the base station from "over-powering" users that are farther away.

Open loop and closed loop power control schemes have been described. The goal of open loop power control is to adjust the transmitted power according to changes in the received power. In the open loop power control method according to IS-95, the mobile station uses the measured total received power along with typical values of certain base station parameters to get a rough estimate of the transmission loss between the unit and the base station. Based on these measurements, the forward link transmission loss is estimated and used to determine the proper open loop power control setting for the mobile station transmitter. The mobile station's transmit power is adjusted to match the estimated path loss, to arrive at the base station at a predetermined level. All mobile stations use the same process, and ideally their signal will arrive with equal power at the base station. See "Telecommunications Industry Association/Electronic Industries Association (TIA/EIA) Interim Standard IS-95 series including IS-95A and IS-95B, entitled "Mobile Station—Base Station Compatibility Standard for Dual-Mode Wideband Spread Spectrum Cellular System."

U.S. Pat. No. 6,101,179 describes a method for open loop power control in a CDMA communication system including calculating in the base station a base station pilot transmit power and a base station received sensitivity value. The base station transmits the pilot transmit power value and the receiver sensitivity value to the mobile base station. The mobile station calculates a mean output power in response to the base station pilot transmit power value and the base station receiver sensitivity value. The open loop control can cope only with very slow shadow fading.

In closed loop power control, the base station measures the relative received power level of each associated mobile station and compares it to an adjustable threshold. A determination is made to transmit a power up command or a power down command to the mobile station. The mobile station can make received adjustment commands with open loop estimates to obtain the final value for transmitted power. The goal of the closed loop power control is to provide rapid corrections to the open loop estimate in order to obtain the optimum transmit power.

A Quality-of-Service (QoS) based closed-loop power control performs better than the power-level based approach. The quantity used to measure QoS is the SIR, or $Eb/I_0$. The IS-95 power control system is an up/down hard decision type. If the actual SIR is lower than an SIR target value, the transmission power is raised by a fixed step size, such as 1.0 dB, or 0.5 dB. Alternatively, if the actual SIR is higher than an SIR target value, the transmission power is reduced by a fixed step size, set as 1.0 dB, 0.5 dB. A conventional power control scheme is called the Distributed Constrained Power Control (DCPC), and is given by S Grandhi, J. Zander and R. Yates, "Constrained Power Control," Wireless Personal Communications, Vol. 1, pp. 257–270, 1995 as:

$$p_i(k+1) = \min\left\{\frac{\gamma_i^{tar}}{\gamma_i(k)} p_i(k), p^{max}\right\} \quad (1)$$

U.S. Pat. No. 6,070,086 describes a method for closed loop power control. A closed loop power control unit is coupled to respective cell-site transmitter/receiver comprising: means for measuring Eblo (the ratio of signal energy per bit to the interference power spectral density), means for generating power adjustment commands corresponding to deviation in corresponding cell-site Eblo measurement a predetermined Eblo level; wherein the coherent detection schemes are used for reverse link (mobile to cell) in the cellular mobile telephone system and wherein it is assumed that the mobile station is capable of receiving the power adjustment commands and adjusts the transmission signal power in correspondence to the power adjustment commands.

The control of power levels of signals transmitted from devices to base stations may be either centralized or distributed. In centralized power control techniques, a single controller determines the power level for each device in the cell, and communicates that level to each device. Centralized control is advantageous in that a desired CIR level can be achieved immediately since the centralized controller has information about devices in contact with the base station (e.g. about which devices will terminate or initiate communications in a time interval). Centralized control, however, needs all the information of all the devices (including all the link gain) and involves the added infrastructure of a central control mechanism thereby resulting in added network vulnerability due to the single point of control. Centralized control schemes have been described in J. Zander, "Performance of optimum transmitter power control in cellular radio systems," IEEE Trans. Veh. Technol., Vol. 41, pp. 57–62, February 1992; and, Grandhi et al., "Centralized power control in cellular radio systems," IEEE Trans. Veh. Technol., Vol. 42, No. 4, pp. 466–468, November 1993. Distributed control, in contrast, only local information is needed for each device and can be an iterative approach in which power levels are adjusted based on feedback from the devices.

Recent work has therefore emphasized distributed, or local, control. In a distributed power control network, the power level of each device is guided using only local measurements, so that eventually all base stations meet any specified CIR requirements. Such power control methods typically adjust the power levels in communications devices based on a determination of a mean (which is a first order statistic) of the interference level at a base station. See, e.g., J. Zander, "Distributed Cochannel Interference Control in Cellular Radio Systems," IEEE Trans. Vehic. Tech. Bol. 41(3), pp. 305–311, August 1992; G. J. Foschini and Z. Mijanic, "A Simple Distributed Autonomous Power Control Algorithm and its Convergence," IEEE Trans. Vehic. Tech, Vol. 42 No. 4), pp. 641–646, November 1993; and S. V. Henly, "Capacity In A Two Cell Special Spectrum Network," 30$^{th}$. Annual Conference on Communication, Control and Computing, Allerton House, Monticello, Ill., pp. 426–435, (1992). Distributed control schemes can use only a user's own link gain or CIR/SIR to determine power control, as Gandhi, et al., "Distributed Power Control In Cellular Radio Systems," IEEE Trans. Comm., Vol. 42, No. 2/3/4, pp. 226–228, February/March/April 1994.

U.S. Pat. No. 5,956,649 describes a method and apparatus which uses a set of parameters characterizing an interference signal at a base unit for determining power levels for signals transmitted from a communication device to the base unit. The set of parameters comprises second or higher order statistics characterizing the interference signal, and the parameters are used to determine a desired power level for signals received at the base unit. The desired power level is communicated to a communications device via a pilot signal transmitted by the base unit at a predetermined level. The predetermined level and the power of the received pilot signal are used to compute a path gain between the base unit and communications device. The path gain and desired power level are then used to determine the power level of signals transmitted from the communications device to the base unit.

It is desirable to provide an improved closed-loop SIR based power control scheme.

SUMMARY OF THE INVENTION

The present invention relates to a method and system for closed loop power control in a mobile communication system. Error is determined between a target signal-to-interference (SIR) and a received SIR. A power control scheme at a power controller of a base station determines a power change that is proportional to the error. Gain of the power controller is selected to achieve minimum error at a subsequent time instant.

The power controller is an estimation based controller and determines an estimate of channel variations. A discrete time H∞ filter can be used as the estimator. Optimally the estimate and prediction of error between a target SIR value and the actual SIR goes to zero in one step. Multiple steps may be needed for the estimator to provide accurate estimations/predictions, for example the estimator may need three to four steps to converge and the error can go to zero in four to five steps.

In all wireless systems, it is desirable that all mobiles transmit with small power as long as they maintain required service quality measured by the SIR. When the channel quality of a mobile user, denoted user i, becomes poor, mobile user i will raise its transmission power to reach the desired SIR. This introduces more interference to the system, other users that will raise their transmission power to maintain their target SIR. In a heavily loaded wireless system, all mobiles will soon end up at their maximum transmission power. This phenomenon is described as the "party effect" and should be prevented. The present invention provides a method for providing joint minimization of SIR error and mobile's transmission power. This joint minimization of the squared error between the SIR target and the actual SIR value plus the square of the transmission power to achieve improved performance.

The invention will be more fully described by reference to the following drawings.

DETAILED DESCRIPTION

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1:
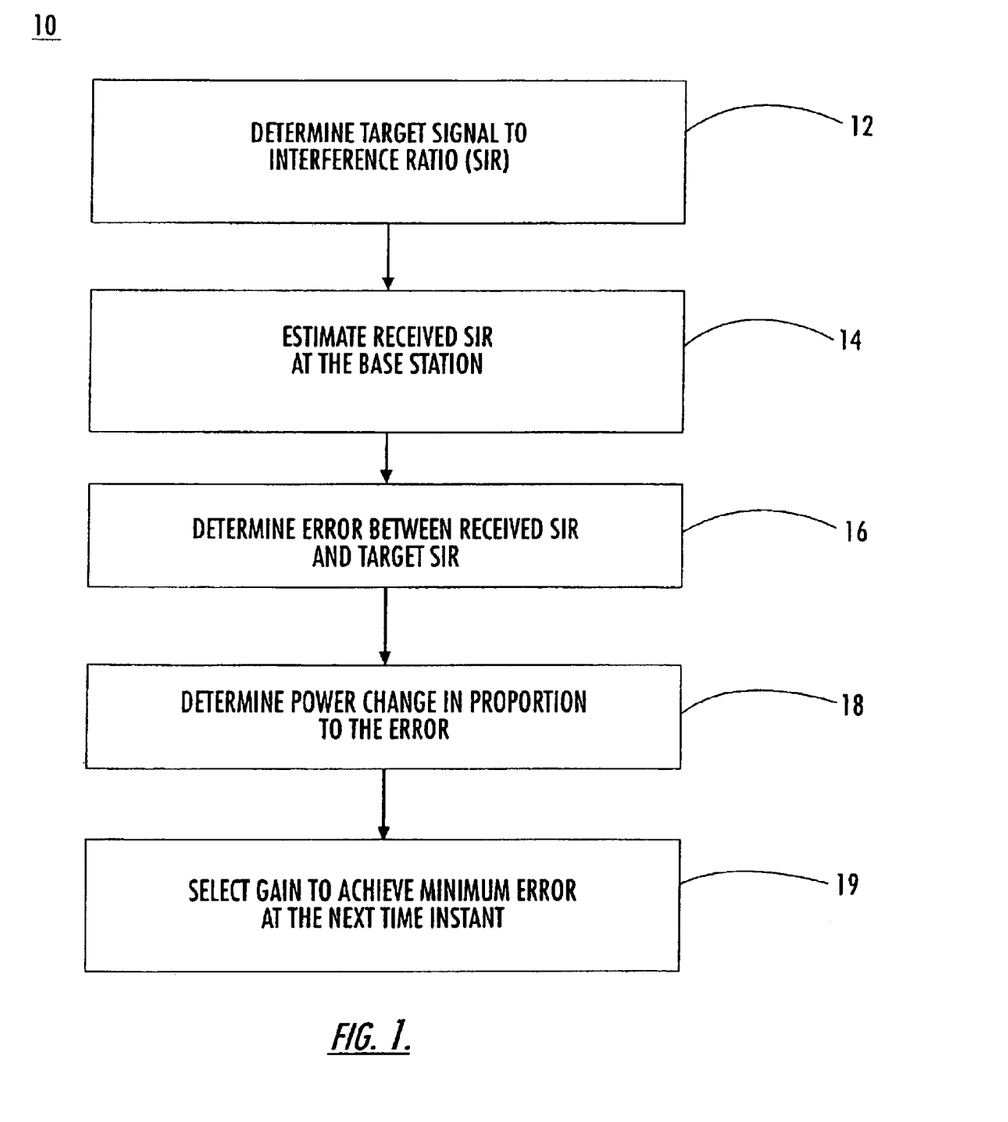
FIG. 1 is a flow diagram of a method for closed loop power control in a wireless system.

FIG. 1 is a flow diagram of a method for closed loop power control in a wireless system 10 in accordance with the teachings of the present invention. In block 12, a target signal to interference ratio (SIR) is determined. For example, the target SIR can be set by mapping the desired Frame Error Rate (FER) to the target SIR or with a predetermined value.

In block 14, an estimate of a received SIR is determined at the base station. Error between the estimated received SIR and the target SIR is determined in block 16. In block 18, the power change is determined to be proportional to the error. The optimal gain of the controller for implementing the power change at the base station is selected to achieve minimum error at the next time instant, in block 19.

Figure 2:
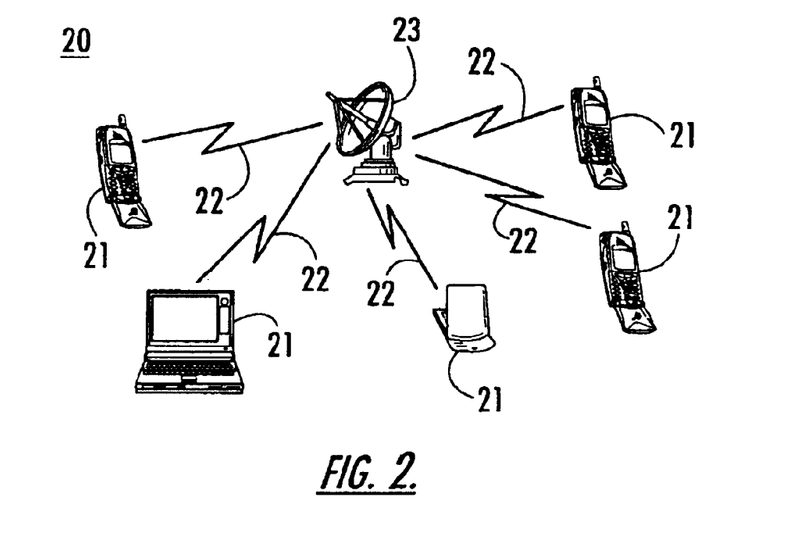
FIG. 2 is a schematic diagram of a wireless system.

FIGS. 2–5 illustrate system for implementing closed loop power control in a wireless system 20 in accordance with the present invention. FIG. 2 is a schematic diagram of a wireless system 20. Mobile units 21 are connected by respective channels 22 to base station 23.

Figure 3:
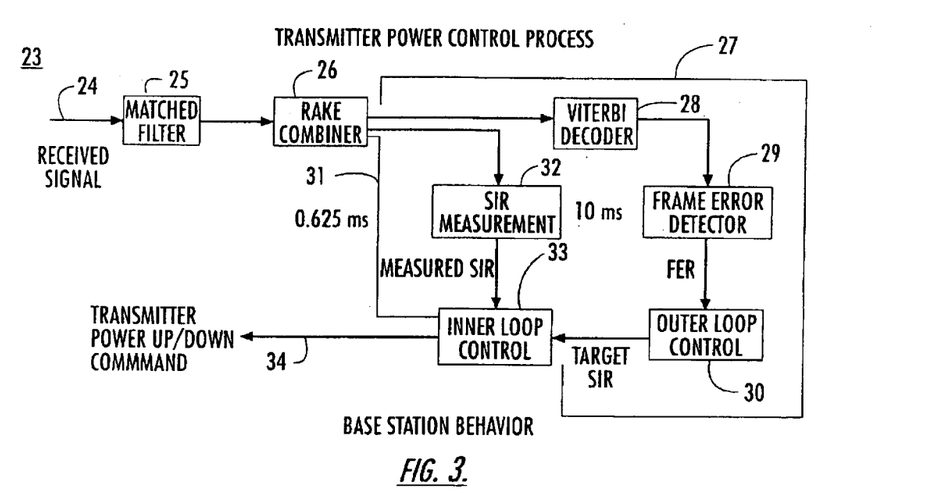
FIG. 3 is a schematic diagram of base station behavior in the closed loop power control method.

FIG. 3 is a schematic diagram of behavior of base station 23. Signal 24 is received at matched filter 25 and is fed to rake combiner 26. Outer loop 27 comprises Viterbi decoder 28, frame error detector 29, and outer loop control 30. The frame error rate (FER) is estimated by frame error detector 29. Outer loop control 30 maps the estimated FER to a target SIR value. Inner loop 31 comprises SIR measurement estimator 32 and inner loop control 33. SIR measurement estimator 32 determines estimated SIR. Inner loop control 33 compares the estimated SIR to the target SIR and determines power control scheme 34. Preferably, outer loop 27 runs at a longer time scale than inner loop 31. For example, outer loop 27 can run at about a 10 ms time scale and inner loop 31 can run at about a 0.625 ms time scale.

Figure 4:
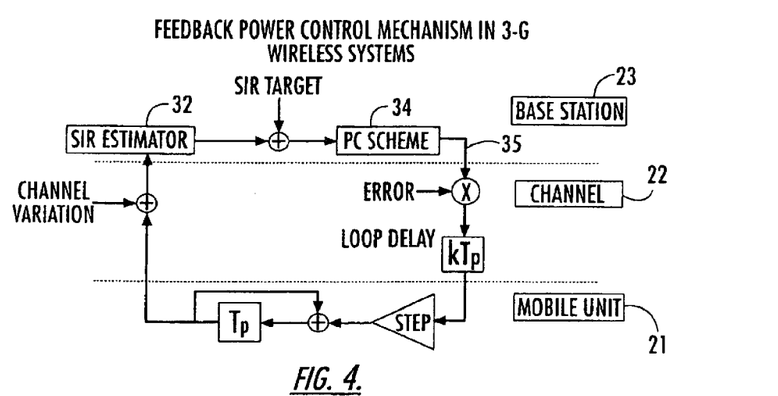
FIG. 4 is a schematic diagram of closed loop power control architecture in a 3-G system.

FIG. 4 illustrates a schematic diagram of closed loop power control architecture in a 3-G system. Power control scheme 34 uses input from SIR measurement estimator 32 and the target SIR value to determine power control command 35. Power control scheme 34 of base station 23 forwards power control command 35 over channel 22 to mobile unit 21.

Figure 5A:
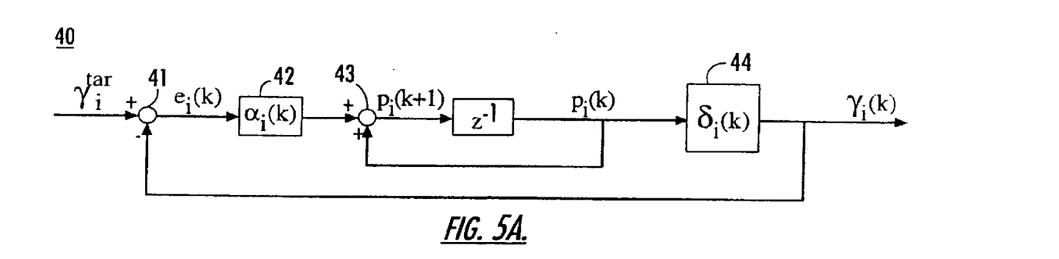
FIG. 5A is a schematic diagram of a closed loop power control system of the present invention.

FIG. 5A is a block diagram of a closed loop power control system 40 in accordance with the teachings of the present invention. The transmission power is determined to be proportional to the error between the actual SIR, $\delta$, and the target SIR, $\delta_i^{tar}$. The transmission power change from time step k to k+1 can be defined as $$\Delta p_i(k+1) = p_i(k+1) - p_i(k) \quad (1)$$

where $p_i(k)$ and $p_i(k+1)$ are the transmission powers from mobile i to the base station at time instants k and k+1, respectively. The error between the actual SIR, $\gamma_i(k)$, and the target SIR, $\gamma_i^{tar}$, denoted by $e_i(k)$ for mobile i at time instant k and is represented by $$e_i(k) = \gamma_i^{tar} - \gamma_i(k) \quad (2)$$

The power control algorithm of the present invention can be represented by $$\Delta p_i(k+1) = \alpha_i(k) e_i(k) \quad (3)$$

where $\alpha_i(k)$ of block 42 is the gain to be determined through an optimization procedure. For example, the optimization procedure can determine the minimization of the square of the error to theoretically reduce the error to zero in each discrete-time instant k. The SIR $\gamma_i^{(k)}$ of an active link is subtracted from target SIR $\gamma_i^{tar}$ in adder 41 to generate error $e_i(k)$. The gain $\alpha_i(k)$ is determined in block 42 from error $e_i(k)$. Gain $\alpha_i(k)$ is applied in adder 43 with transmission power $p_i(k)$ to select the gain to achieve the minimum error of transmission power $p_i(k+1)$. Block 44 determines channel variation $\delta_i(k)$ which can be used in determining gain $\alpha_i(k)$.

Figure 5B:
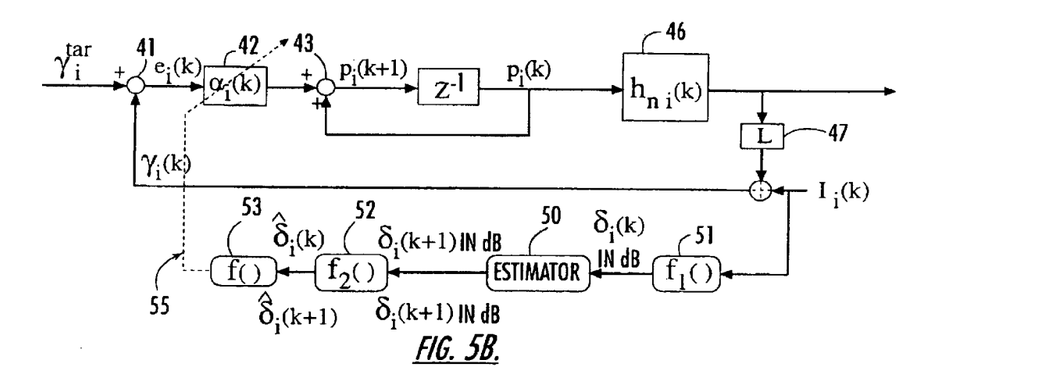
FIG. 5B is a schematic diagram of the closed loop power control system including an estimator.

A block diagram of the power control scheme of the present invention with an estimator is shown in FIG. 5B. The SIR of an active link from mobile station i to base station n in a wireless system is defined as $$\gamma_{ni} = \frac{L h_{ni} p_i}{\sum_{j \neq i} h_{nj} p_j + \sigma^2} \quad (4)$$

where $h_{ni}$ is the link gain from mobile station L to base station n as shown in block 46. L is the processing gain as shown in block 47. For example L can be the processing gain in a spread spectrum wireless system. For example, in CDMA 2000, L is 64 or 128 or 256. $\sigma^2$ is the background noise at the base station. The denominator can be denoted by $I_i$, which is the received interference, and SIR can be rewritten as $$\gamma_{ni} = \frac{L h_{ni} p_i}{I_i} \quad (5)$$

Assuming that a mobile only transmits to one base station during the time of power control, then $\gamma_{ni}$ can be simplified as $\gamma_i$. The channel variation is represented by $$\delta_i = \frac{L h_{ni}}{I_i},$$

which is estimated and predicted in the power control scheme using estimator 50, function $f_1(\ )$ of block 51, function $f_2(\ )$ of block 52 and function $f(\ )$ of block 53. $\hat{\delta}_i(k)$ and $\hat{\delta}_i(k+1)$ denote the estimated/predicted value respectively of $\delta_i(k)$ and $\delta_i(k+1)$. The distributed power control scheme can be determined by minimizing the square of error between the target SIR and the actual value.

$f(\ )$ of block 53 is defined as $$f(x_1, x_2) = \begin{cases} \frac{1}{x_1}\left(1 - \frac{\gamma_i^{tar}}{e_i(k)}\right) + \frac{1}{x_2} \frac{\gamma_i^{tar}}{e_i(k)} & \text{if } e_i(k) \neq 0 \\ 0 & \text{if } e_i(k) = 0 \end{cases} \quad (7)$$

$f_1(x)$ of block 51 is $10 \log_{10}(x)$ and $f_2(x)$ of block 52 is $10^{(x)/10}$ which are converting functions between W and dBW. W is the unit of power, Watt. Accordingly, feedback loop 55 computes the optimal gain of the controller based on the estimated/predicted channel variations.

The performance criterion at time instant k can be defined as $$J_i(k) = \min_{\alpha_i(k)} (e_i(k+1))^2, \, i = 1, 2, \ldots, N. \quad (8)$$

The optimal gains of the power control algorithm to minimize $J_i(k)$ at every time instant k are $$\alpha_i^{opt}(k) = \begin{cases} \frac{1}{\delta_i(k)}\left(1 - \frac{\gamma_i^{tar}}{e_i(k)}\right) + \frac{1}{\delta_i(k+1)} \frac{\gamma_i^{tar}}{e_i(k)} & \text{if } e_i(k) \neq 0 \\ 0 & \text{if } e_i(k) = 0 \end{cases} \quad (8.1)$$

where $$\delta_i(k) = \frac{Lh_{ni}(k)}{I_i(k)} > 0, \, \delta_i(k+1) = \frac{Lh_{ni}(k+1)}{I_i(k+1)} < 0$$

and $h_{ni}(k), h_{ni}(k+1), I_i(k+1) > 0 \forall k$.

The minimal value of the performance criterion is zero when the optimal gain $\alpha_i^{opt}(k)$ is applied.

The optimal distributed power control scheme is given by $$p_i(k+1) = \begin{cases} p^{min} & \text{if } \hat{\delta}_i(k+1) > \frac{\gamma_i^{tar}}{p^{min}} \\ p^{max} & \text{if } \hat{\delta}_i(k+1) < \frac{\gamma_i^{tar}}{p^{max}} \\ p_i(k) + \hat{\alpha}_i(k)e_i(k) = \frac{\gamma_i^{tar}}{\hat{\delta}_i(k+1)} & o.w. \end{cases} \quad (9)$$

where the gain applied to the power control scheme $\hat{\alpha}_i(k)$ is defined by $$\hat{\alpha}_i(k) = \begin{cases} \frac{1}{\hat{\delta}_i(k)}\left(1 - \frac{\gamma_i^{tar}}{e_i(k)}\right) + \frac{1}{\hat{\delta}_i(k+1)} \frac{\gamma_i^{tar}}{e_i(k)} & \text{if } e_i(k) \neq 0 \\ 0 & \text{if } e_i(k) = 0 \end{cases} \quad (10)$$

Equation (9) is consistent with Pontriagin's minimum principle such that in constrained optimization, optimal solutions lie on the boundary. Closed loop power control system 40 can be implemented at base station 23, shown in FIG. 2.

Figure 5C:
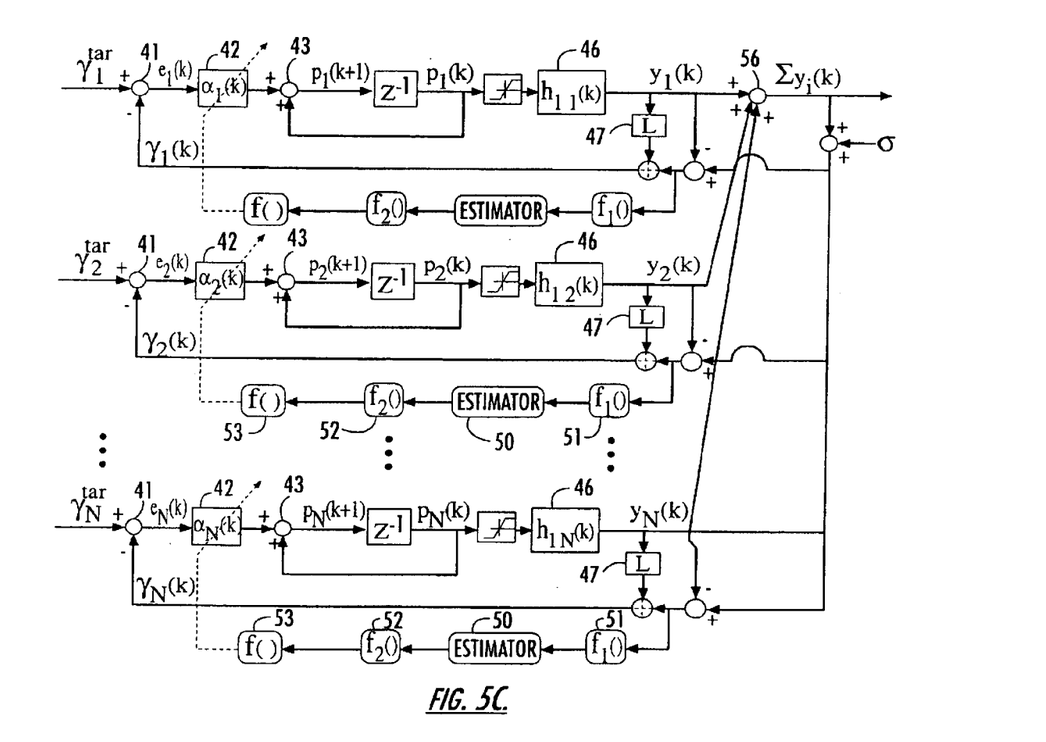
FIG. 5C is a schematic diagram of the closed loop power control system for N links.

FIG. 5C is a schematic diagram of a distributed power control system with estimations for N links. The present invention provides a method for providing joint minimization of SIR error and transmission error SIR joint minimization of squared error between the SIR target and the actual SIR value plus the square of the transmission power to achieve improved performance.

The performance criterion at time instant k is defined as $$J_i(k) = \min_{\alpha_i(k)} [\rho_1(e_i(k+1))^2 + \rho_2(p_i(k+1))^2], \quad (11)$$

$$i = 1, 2, \ldots, N.$$

where $\rho_1 > 0$ and $\rho_2 > 0$ are weighting parameters.

In this embodiment $f(\,)$ is defined as $$f(x_1, x_2) = \begin{cases} \frac{1}{x_1}\left(1 - \frac{\gamma_i^{tar}}{e_i(k)}\right) + \frac{\rho_1 x_2}{\rho_1 x_2^2 + \rho_2} \frac{\gamma_i^{tar}}{e_i(k)} & \text{if } e_i(k) \neq 0 \\ 0 & \text{if } e_i(k) = 0 \end{cases} \quad (12)$$

$f_1(x) = 10 \log_{10}(x)$ and $f_2(x) = 10^{(x)/10}$ are converting functions between W and dBW. The optimal distributed power control scheme by joint optimization is given by $$p_i(k+1) = \begin{cases} p^{min} & \text{if } \hat{\delta}_i(k+1) > \frac{\gamma_i^{tar}}{p^{min}} \\ p^{max} & \text{if } \frac{\rho_1(\hat{\delta}_i(k+1))^2 + \rho_2}{\rho_1(\hat{\delta}_i(k+1))} < \frac{\gamma_i^{tar}}{p^{max}} \\ p_i(k) + \hat{\alpha}_i(k)e_i(k) & o.w. \end{cases} \quad (13)$$

where $\hat{\alpha}_i(k)$ is defined in the following equation:

$$\hat{\alpha}_i(k) = \begin{cases} \frac{1}{\hat{\delta}_i(k)}\left(1 - \frac{\gamma_i^{tar}}{e_i(k)}\right) + \frac{\rho_1 \hat{\delta}_i(k+1)}{\rho_1(\hat{\delta}_i(k+1))^2 + \rho_2} \frac{\gamma_i^{tar}}{e_i(k)} & \text{if } e_i(k) \neq 0 \\ 0 & \text{if } e_i(k) \neq 0 \end{cases} \quad (14)$$

The power control $y_i(k)$ of each link is added in adder 56.

Figure 6:
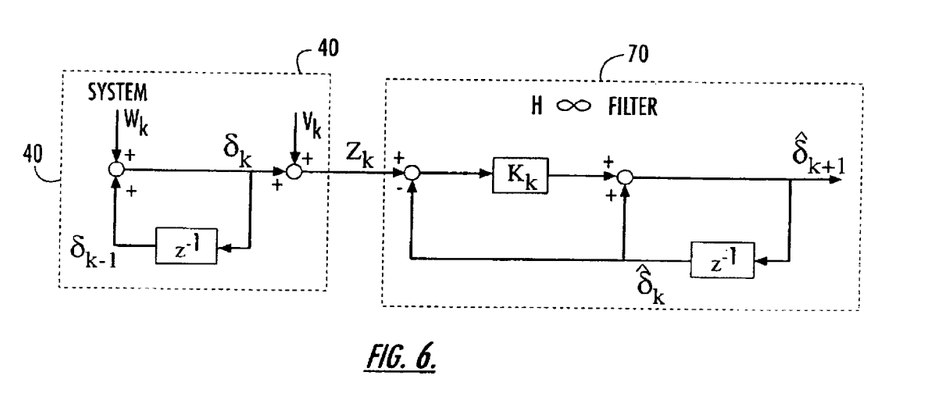
FIG. 6 is a schematic diagram of a H∞ filter.

Estimator 50 can be a conventional filter. In general, fluctuation of $\delta(k)$ and $\delta(k+1)$ do not have a Gaussian distribution. Accordingly, filters which do not use knowledge of the statistics of the process and/or noise are preferable. The H∞ filter which does not require any knowledge of the statistics of system and measurement disturbances is preferable for implementation of the present invention. FIG. 6 illustrates of schematic diagram of a discrete H∞ filter 70 which can be used with closed loop power control system 40.

Consider the following discrete-time system $$x(k+1) = A(k)x(k) + B(k)w(k), \, x(0) = x_0 \quad (15)$$

with the measurements $$z(k) = C(k)x(k) + v(k) \quad (16)$$

where x(k) is the state vector, w(k) is the process noise vector, z(k) is the measurement vector and v(k) is the measurement noise vector. A(k), B(k) and C(k) are matrices of appropriate dimensions. The measurement history is defined as z(k), k=0, 1, . . . , N−1. The estimate of $\hat{x}(k)$ can be computed based on the measurement history up to k−1. The H∞ filter provides an uniformly small estimation error $x(k) - \hat{x}(k)$ for any $w(k), v(k) \in l_2$ and $x_0 \in R^n$. The performance criterion is given by $$J = \frac{\sum_{k=0}^{N-1} \|x(k) - \hat{x}(k)\|_{Q(k)}^2}{\|x(0) - \hat{x}(0)\|_{P_{-1}(0)}^2 + \sum_{k=0}^{N-1} \|w(k)\|_{W^{-1}(k)}^2 + \|v(k)\|_{V^{-1}(k)}^2} \quad (17)$$

where Q(k), W(k) and V(k) are weighting matrices. Accordingly, the optimization problem is $$\sup_{Q(k),W(k),V(k)} J < \frac{1}{\lambda} \quad (18)$$

where $\lambda$ is a prescribed level of noise attenuation. The resulted discrete-time H∞ filter is given by $$\hat{x}(k+1)=A(k)\hat{x}(k)+K(k)(z(k)-C(k)\hat{x}(k)) \quad (19)$$

where K(k) is the optimal gain of the H∞ filter and is computed by the following equation $$K(k)=A(k)P(k)(I-\lambda Q(k)P(k)+C^T(k)V^{-1}(k)C(k)P(k))^{-1}C^T(k)V^{-1}(k) \quad (20)$$

where P(k) is the unique positive definite solution of the following discrete-time Riccati equation $$P(k+1)=A(k)P(k)(I-\lambda Q(k)P(k)+C^T(k)V^{-1}(k)C(k)P(k))^{-1}A^T(k)+B(k)W(k)B^T(k) \quad (21)$$

with $P(0)=P_0$.

Figure 7:
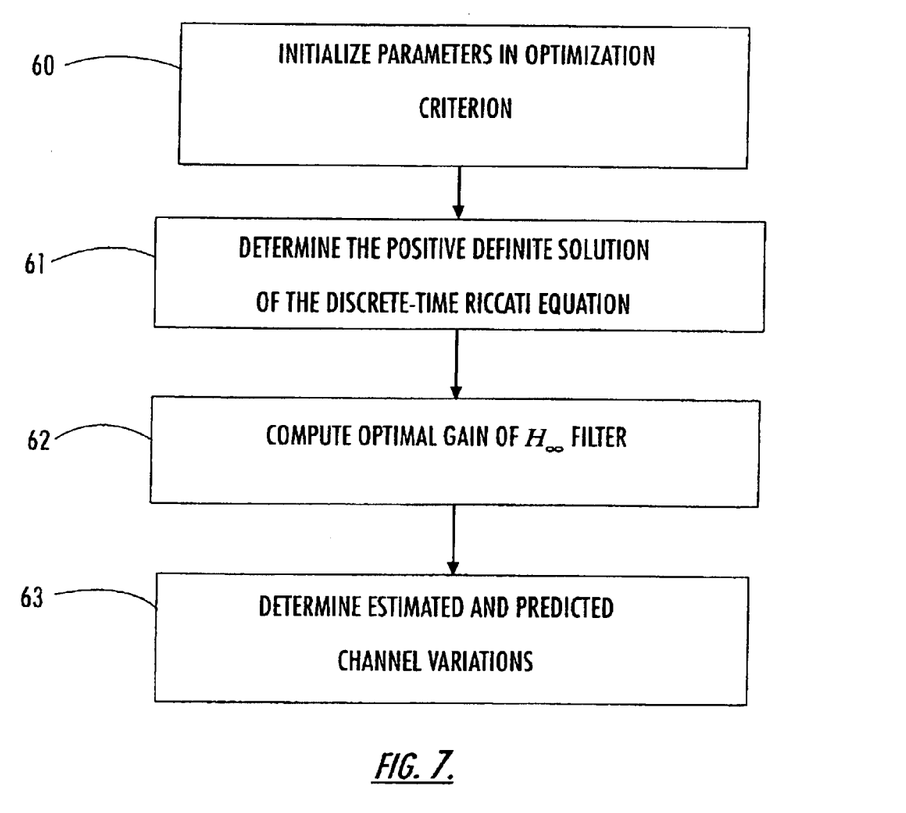
FIG. 7 is a flow diagram of estimator using the discrete time H∞ filter.

FIG. 7 is a flow diagram of estimation using the discrete time H∞ filter. In block 60, all the parameters in the optimization criterion ($Q_i, V_i, W_i, \lambda), \hat{\delta}_i(0)=\delta_{i0}$ are initialized and matrix $P_i(0)=P_{i0}$ for k=0.

In block 61, the solution of the following scalar discrete-time Riccati equation is computed from $$P_i(k+1) = \frac{P_i(k)}{1-\lambda Q_i(k)+\frac{P_i(k)}{V_i}} + W_i \quad (22)$$

In block 62 the optimal gain $K_i(k)$ of the H∞ filter is computed from $$K_i(k) = \frac{P_i(k)}{\left(1-\lambda Q_i P_i(k)+\frac{P_i(k)}{V_i}\right)V_i} \quad (23)$$

In block 63 estimated and predicted channel variation ($\hat{\delta}_i(k),\hat{\delta}_i(k+1)$) is computed through the discrete-time $H_\infty$ filter, which is given by $$\hat{\delta}_i(k+1)=\hat{\delta}_i(k)+K_i(k)(y_i(k)-\hat{\delta}_i(k)) \quad (24)$$

In block 64, k is incremented as. k=k+1, and blocks 61–63 are repeated.

Figure 8A:
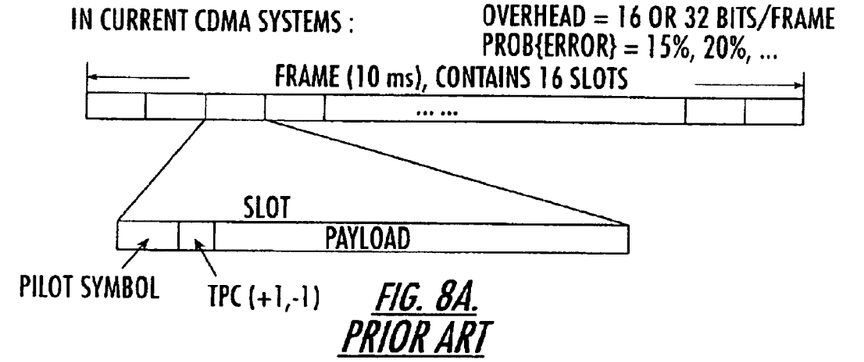
FIG. 8A is a schematic diagram of a frame format for a prior art CDMA power control scheme.
Figure 8B:
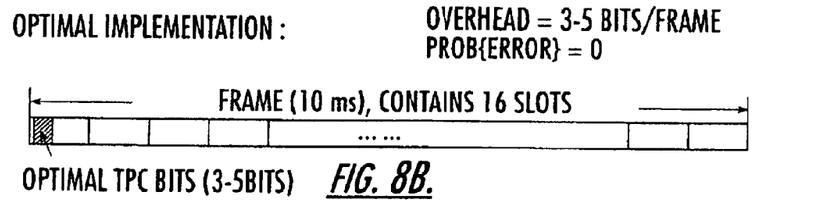
FIG. 8B is a schematic diagram of a frame format for the power control scheme of the present invention.

FIG. 8A represents implementation in a frame format of a prior art CDMA power control scheme. Frame 70 includes pilot symbol 72 and power control TPC (+1, −1) 73 and payload 74. The overhead is 16 or 32 bits/frame. FIG. 8B represents implementation of a frame format for the power control scheme of the present invention. Power control TPL is 3 to 5 bits. Accordingly, the overhead is 3 to 5 bits/frame.

A simulation of a CDMA system was performed to demonstrate the effectiveness of optimal power control method 10 as compared to conventional existing power control schemes. Four users in a single hexagonal cell were used in the simulation. The operating frequency was about 1.9 GHz and the bandwidth of each channel is assumed to be about 1.23 HMz, in accordance to the CDMA 2000 standard as described in ITU, RTT 45.5, CDMA 2000 standard. The data rate was set at 9600 bps and the processing gain was set to 32. The target SIR is 10 dB, which corresponds to the bit error rate (BER) being less than $10^{-4}$. The SIR includes the processing gain, which is denoted by $$\frac{E_b}{N_0}$$

in the standard IS-95B described in TIA/EIA Interim Standard-95B: Mobile station-base station compatibility standard for dual-mode wideband spread spectrum cellular system, TIA, 1998 and CDMA 2000 ITU, RTT 45.5, CDMA 2000 standard, hereby incorporated by reference into this application, where $E_b$ is the energy per information bit and $N_0$ is the interference power spectral density.

The following assumptions were used in the simulation:
1. The effects of antenna directivity, voice activity factor, and soft handoff were ignored.
2. The minimum and maximum power that can be transmitted by a mobile as described in IS-95B is $p_{min}$=8 dBm(6.3 mW) and $p_{max}$=33 dBm(2 W), respectively.
3. The background noise power is 0.5 mW.
4. The transmitted power is updated periodically, every 0.625 msec, which corresponds to 1,600 Hz fast closed-loop power control frequency as proposed in IMT-2000.
5. The antenna of the base station and all mobiles are omnidirectional.
6. The location of the mobiles are assumed to be uniformly distributed in a cell.
7. It is assumed that the link gains have the following form $$h_{ni}(k)=d_{ni}^{-4}(k)A_{ni}(k)B_{ni}(k) \quad (15)$$

where $d_{ni}(k)$ is the distance from the ith mobile to the nth base station at time instant $k_i$, $A_{ni}$ is a log-normal distributed stochastic process, and $B_{ni}$ is contributed by Rayleigh fading. $d_{ni}(k)$, $A_{ni}$, and $B_{ni}(k)$ change in time since they are functions of mobile velocity and frequency. Using method 10, the desired SIR achieved in less than 10 steps (6.25 msec), such that $d_{ni}(k)$ and $A_{ni}$ barely change during this short time period.

8. It is assumed that the cell diameter is 2 km and $D_{ni}(k)$ is a 2-D uniformly distributed random variable, as described in G. Stuber, Principles of Mobile Communication, Kluwer Academic Publishers, 1996, hereby incorporated by reference.
9. It is assumed that the standard deviation of $A_{ni}$ is 8.
10. The speed of the mobiles range from about 0.5 mph to about 75 mph. The maximum Doppler frequency is 80 Hz, which correspond to 60 mph mobile speed. $B_{ni}(k)$ is simulated for the 4-user case by using a filtered Gaussian noise model.
11. The mean value of the link gains are used in the simulation.

Figure 9:
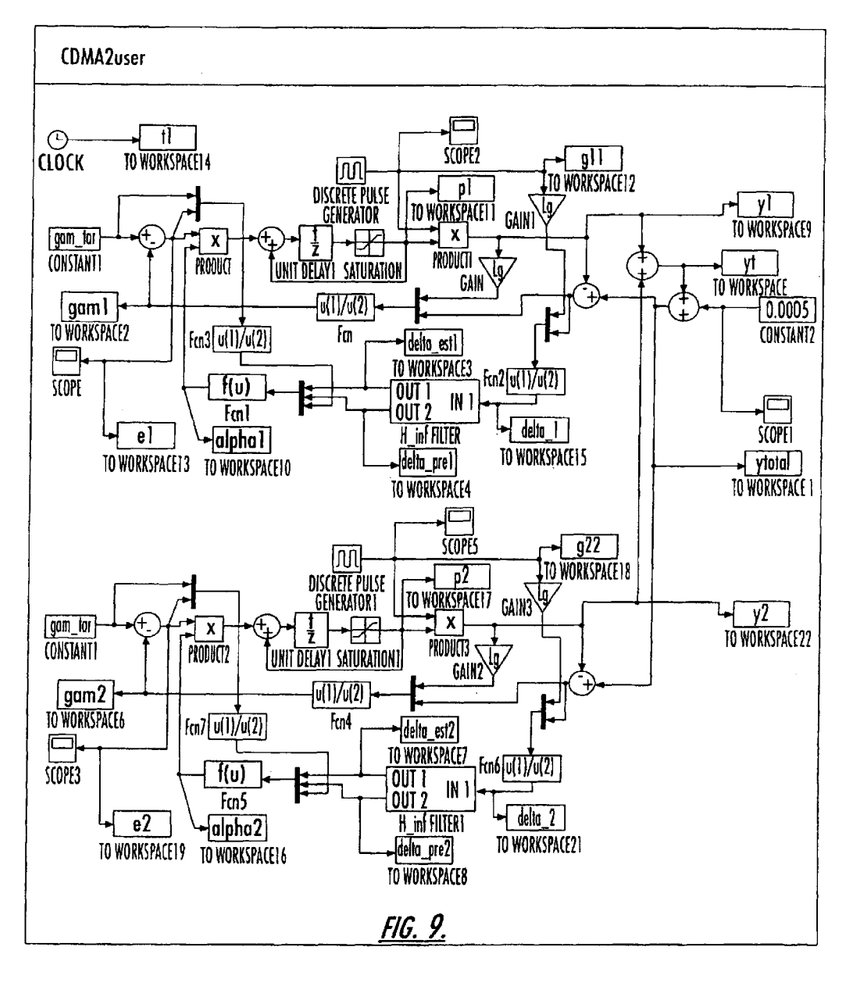
FIG. 9 is a schematic diagram of a SIMULINK model of the closed loop power control system of the present invention for a two user system.
Figure 10:
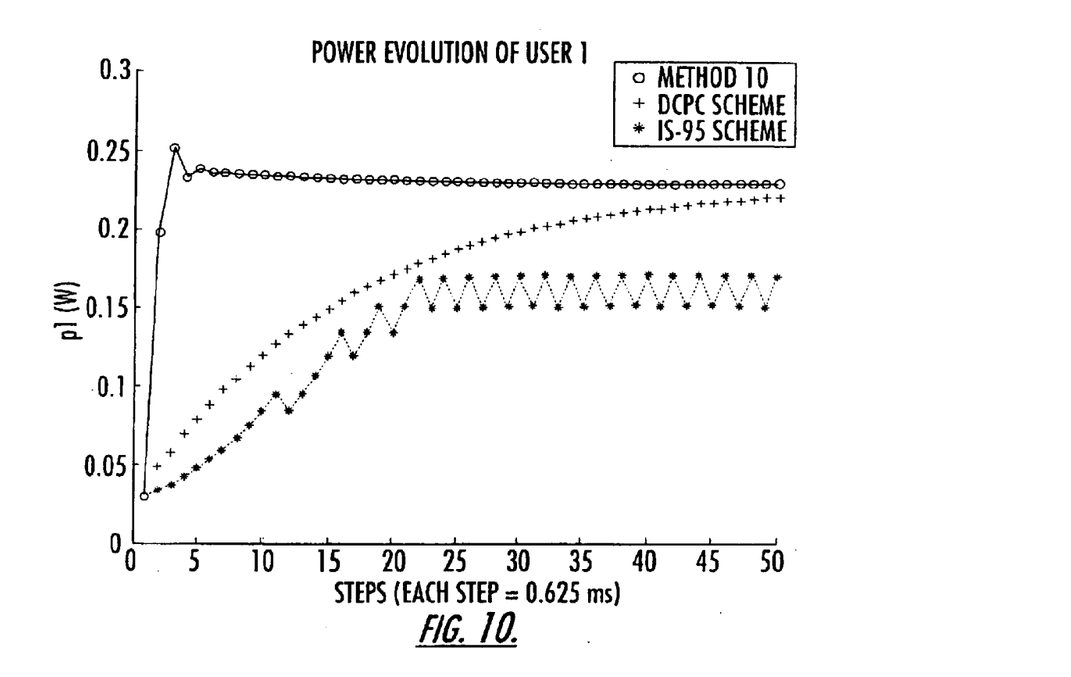
FIG. 10 is a signal comparison of power evolution for one user for the power scheme of the present invention, DCPC and IS-95.
Figure 11:
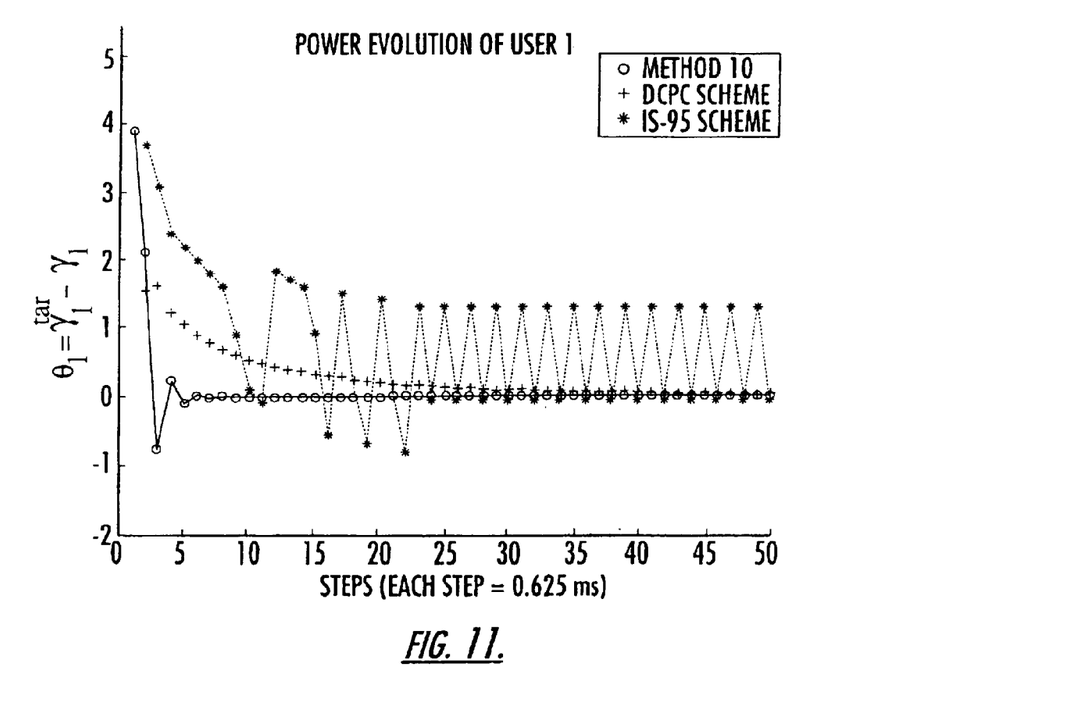
FIG. 11 is a signal comparison of error performance for one user for the power scheme of the present invention DCPC and IS-95.

FIG. 9 illustrates a SIMULINK model of closed loop power control system 40. FIGS. 10–13 show results of the simulation. The power evolution of method 10 is compared with DCPC and IS-95 in FIG. 10. The error performance of method 10 is compared with DCPC and IS-95 in FIG. 11. It is shown that when the channel is stationary (the mean values of the channels are constants in the simulation), method 10 saves at least 2 frames, which frames are lost when applying the other two conventional power control schemes. When channel changes frequently, the estimator of method 10 provides good tracking of the channel quality and the proposed optimal power control scheme and provides accurate value of power adjustment immediately. The DCPC scheme and the IS-95 scheme do not converge fast enough to give appropriate power change.

Figure 12:
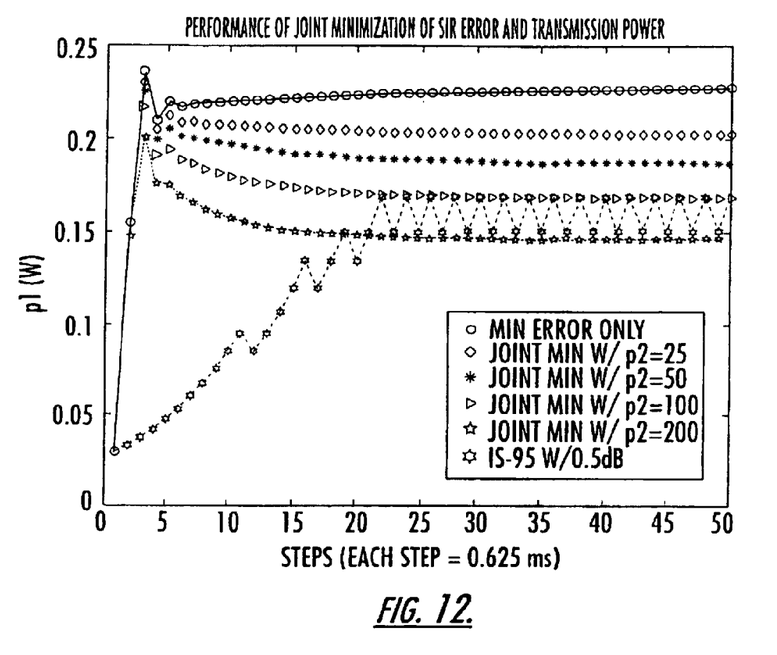
FIG. 12 is a signal comparison of performance of joint minimization of SIR error and transmission power for varying weighting parameters and IS-95 with 0.5 dB.
Figure 13:
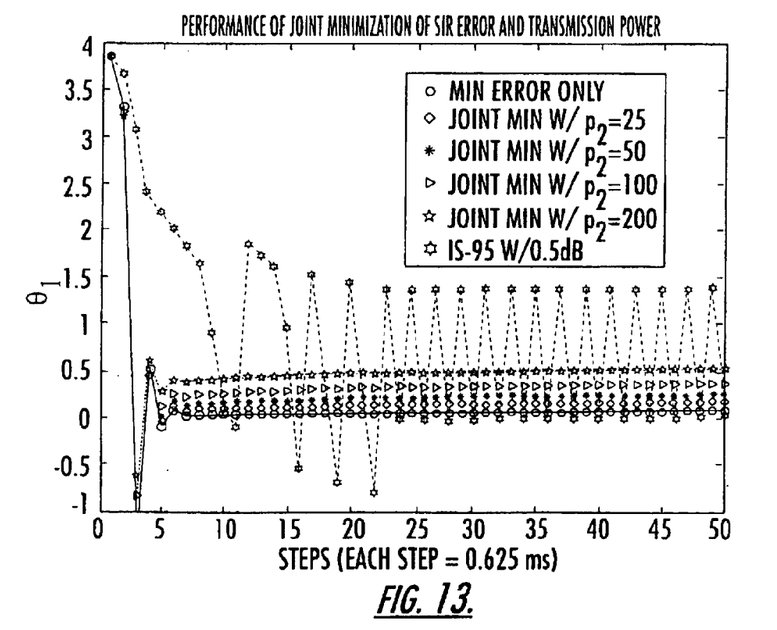
FIG. 13 is a signal comparison of performance of joint minimization of SIR error and transmission power for varying weighting parameters and IS-95 with 0.5 dB.

A comparison of the power evolution and SIR error performance using a power control scheme of method 10 by applying joint minimization of SIR error and transmission power, using the power control scheme of method 10 minimizing SIR error only, and IS-95, are shown in FIG. 12 and FIG. 13. It is shown that with the panelty on mobile's transmission power, the method of the joint minimization scheme of the present invention uses less mobile's transmission power, while keeping small SIR error. The SIR error performance is the same as using the optimal power control scheme which minimizes SIR error only in the practical CDMA systems since there is quantization effect at the mobile when receiving power control command. It is shown that method 10 which minimizes SIR error only can not achieve zero SIR error due to the quantization effect. Method 10 including joint minimization in the power control scheme has the advantage of saving the mobile's transmission power, while maintaining similar level of SIR error. With less mobile's transmission power, the method 10 of the present invention including the joint minimization scheme has much better SIR error performance than the IS-95 scheme. When there is no panelty on mobile's transmission power by setting $p_2=0$, the joint minimization scheme, of the present invention, reduces to the optimal power control scheme which minimizes SIR error only.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

What is claimed is:

1. A transmission power control method for a mobile communication system comprising the steps of:

determining a target Signal-to-Interference Ratio (SIR);

estimating a received SIR of a base station;

determining error between the received SIR and the target SIR;

determining a power control scheme at a power controller of the base station to determine a power change for the transmission power of a mobile to the base station in proportion to the error;

selecting a gain of the power controller to achieve minimum error at a subsequent time instant; and estimating channel variation and using said estimated channel variation in said step of selecting said gain wherein an output function of the estimation is $$f(x_1, x_2) = \begin{cases} \frac{1}{x_1}\left(1 - \frac{\gamma_i^{tar}}{e_i(k)}\right) + \frac{1}{x_2}\frac{\gamma_i^{tar}}{e_i(k)} & \text{if } e_i(k) \neq 0 \\ 0 & \text{if } e_i(k) = 0 \end{cases}$$

where $e_i(k)$ is said error and $\gamma_i^{tar}$ is said target SIR.

2. The method of claim 1 wherein said power control scheme is $$p_i(k+1) = \begin{cases} p^{min} & \text{if } \hat{\delta}_i(k+1) > \frac{\gamma_i^{tar}}{p^{min}} \\ p^{max} & \text{if } \hat{\delta}_i(k+1) < \frac{\gamma_i^{tar}}{p^{max}} \\ p_i(k) + \hat{\alpha}_i(k)e_i(k) = \frac{\gamma_i^{tar}}{\hat{\delta}_i(k+1)} & o.w. \end{cases}$$

where the gain applied to the power control scheme $\hat{\alpha}_i(k)$ is defined by $$\hat{\alpha}_i(k) = \begin{cases} \frac{1}{\hat{\delta}_i(k)}\left(1 - \frac{\gamma_i^{tar}}{e_i(k)}\right) + \frac{1}{\hat{\delta}_i(k+1)}\frac{\gamma_i^{tar}}{e_i(k)} & \text{if } e_i(k) \neq 0 \\ 0 & \text{if } e_i(k) = 0 \end{cases}$$

where $\hat{\delta}$ is estimated channel variation.

3. The method of claim 1 wherein said power change is transmitted from said base station to said mobile in a frame format on a downlink from said base station to said mobile.

4. The method of claim 3 wherein overhead of said power change is in the range of 3 to 5 bits per frame.

5. A transmission power control method for a mobile communication system comprising the steps of:

determining a target Signal-to-Interference Ratio (SIR);

estimating a received SIR of a base station;

determining error between the received SIR and the target SIR;

determining a power control scheme at a power controller of the base station to determine a power change for the transmission power of a mobile to the base station in proportion to the error;

selecting a gain of the power controller to achieve minimum error at a subsequent time instant; and estimating channel variation and using said estimated channel variation in said step of selecting said gain wherein said estimator is a H∞ filter and said H∞ filter determines estimated channel variations at time instant k of $\hat{\delta}_i(k)$ and at subsequent time instant k+1 of $\hat{\delta}_i(k+1)$.

6. The method of claim 5 wherein said power change is transmitted from said base station to said mobile in a frame format on a downlink from said base station to said mobile.

7. A transmission power control method for a mobile communication system comprising the steps of:

determining a target Signal-to-Interference Ratio (SIR);

estimating a received SIR of a base station;

determining error between the received SIR and the target SIR;

determining a power control scheme at a power controller of the base station to determine a power change for the transmission power of a mobile to the base station in proportion to the error;

selecting a gain of the power controller to achieve minimum error at a subsequent time instant; and estimating channel variation and using said estimated channel variation in said step of selecting said gain wherein an output function of the estimator is $$f(x_1, x_2) = \begin{cases} \frac{1}{x_1}\left(1 - \frac{\gamma_i^{tar}}{e_i(k)}\right) + \frac{\rho_1 x_2}{\rho_1 x_2^2 + \rho_2}\frac{\gamma_i^{tar}}{e_i(k)} & \text{if } e_i(k) \neq 0 \\ 0 & \text{if } e_i(k) = 0 \end{cases}$$

where $\rho_1 > 0$ and $\rho_2 > 0$ are weighting parameters where $e_i(k)$ is said error and $\gamma_i^{tar}$ is said target SIR.

8. The method of claim 7 wherein said power control scheme is $$p_i(k+1) = \begin{cases} p^{min} & \text{if } \hat{\delta}_i(k+1) > \frac{\gamma_i^{tar}}{p^{min}} \\ p^{max} & \text{if } \frac{\rho_1(k+1)^2 + \rho_2}{\rho_1 \hat{\delta}_i(k+1)} < \frac{\gamma_i^{tar}}{p^{max}} \\ p_i(k) + \hat{\alpha}_i(k)e_i(k) & o.w. \end{cases}$$

where $\hat{\alpha}_i(k)$ is defined in the following equation:

$$\hat{\alpha}_i(k) = \begin{cases} \frac{1}{\hat{\delta}_i(k)}\left(1 - \frac{\gamma_i^{tar}}{e_i(k)}\right) + \frac{\rho_1\hat{\delta}_i(k+1)}{\rho_1(\hat{\delta}_i(k+1))^2 + \rho_2}\frac{\gamma_i^{tar}}{e_i(k)} & \text{if } e_i(k) \neq 0 \\ 0 & \text{if } e_i(k) + 0. \end{cases}$$

9. The method of claim 7 wherein said power change is transmitted from said base station to said mobile in a frame format on a downlink from said base station to said mobile.

10. A transmission power control system for a mobile communication system comprising: means for determining a target Signal-to-Interference Ratio (SIR);
means for estimating a received SIR of a base station;
means for determining error between the received SIR and the target SIR;
means for determining a power control scheme at a power controller of the base station to determine a power change for the transmission power of a mobile to the base station in proportion to the error;
means for selecting a gain of the power controller to achieve minimum error at a subsequent time instant; and
means for estimating channel variation and using said estimated channel variation in said step of selecting said gain wherein an output function of the estimation is $$f(x_1, x_2) = \begin{cases} \frac{1}{x_1}\left(1 - \frac{\gamma_i^{tar}}{e_i(k)}\right) + \frac{1}{x_2}\frac{\gamma_i^{tar}}{e_i(k)} & \text{if } e_i(k) \neq 0 \\ 0 & \text{if } e_i(k) = 0 \end{cases}$$

where $e_i(k)$ is said error and $\gamma_i^{tar}$ is said target SIR.

11. The system of claim 10 wherein said power control scheme is $$p_i(k+1) = \begin{cases} p^{min} & \text{if } \hat{\delta}_i(k+1) > \frac{\gamma_i^{tar}}{p^{min}} \\ p^{max} & \text{if } \hat{\delta}_i(k+1) < \frac{\gamma_i^{tar}}{p^{max}} \\ p_i(k) + \hat{\alpha}_i(k)e_i(k) = \frac{\gamma_i^{tar}}{\hat{\delta}_i(k+1)} & o.w. \end{cases}$$

where the gain applied to the power control scheme $\hat{\alpha}_i(k)$ is defined by $$\hat{\alpha}_i(k) = \begin{cases} \frac{1}{\hat{\delta}_i(k)}\left(1 - \frac{\gamma_i^{tar}}{e_i(k)}\right) + \frac{1}{\hat{\delta}_i(k+1)}\frac{\gamma_i^{tar}}{e_i(k)} & \text{if } e_i(k) \neq 0 \\ 0 & \text{if } e_i(k) = 0 \end{cases}$$

where $\hat{\delta}$ is estimated channel variation.

12. The system of claim 10 wherein said power change is transmitted from said base station to said mobile in a frame format on a downlink from said base station to said mobile.

13. The system of claim 12 wherein overhead of said power change is in the range of 3 to 5 bits per frame.

14. A transmission power control system for a mobile communication system comprising: means for determining a target Signal-to-Interference Ratio (SIR);
means for estimating a received SIR of a base station;
means for determining error between the received SIR and the target SIR;
means for determining a power control scheme at a power controller of the base station to determine a power change for the transmission power of a mobile to the base station in proportion to the error;
means for selecting a gain of the power controller to achieve minimum error at a subsequent time instant; and
means for estimating channel variation and using said estimated channel variation in said step of selecting said gain wherein said estimator is a H∞ filter and said H∞ filter determines estimated channel variations at time instant k of $\hat{\delta}_i(k)$ and at subsequent time instant k+1 of $\hat{\delta}_i(k+1)$.

15. The system of claim 14 wherein said power change is transmitted from said base station to said mobile in a frame format on a downlink from said base station to said mobile.

16. A transmission power control system for a mobile communication system comprising: means for determining a target Signal-to-Interference Ratio (SIR);
means for estimating a received SIR of a base station;
means for determining error between the received SIR and the target SIR;
means for determining a power control scheme at a power controller of the base station to determine a power change for the transmission power of a mobile to the base station in proportion to the error;
means for selecting a gain of the power controller to achieve minimum error at a subsequent time instant; and
means for estimating channel variation and using said estimated channel variation in said step of selecting said gain wherein an output function of the estimator is $$f(x_1, x_2) = \begin{cases} \frac{1}{x_1}\left(1 - \frac{\gamma_i^{tar}}{e_i(k)}\right) + \frac{\rho_1 x_2}{\rho_1 x_2^2 + \rho_2}\frac{\gamma_i^{tar}}{e_i(k)} & \text{if } e_i(k) \neq 0 \\ 0 & \text{if } e_i(k) = 0 \end{cases}$$

where $\rho_1 > 0$ and $\rho_2 > 0$ are weighting parameters
where $e_i(k)$ is said error and $\gamma_i^{tar}$ is said target SIR.

17. The system of claim 16 wherein said power control scheme is $$p_i(k+1) = \begin{cases} p^{min} & \text{if } \hat{\delta}_i(k+1) > \frac{\gamma_i^{tar}}{p^{min}} \\ p^{max} & \text{if } \frac{\rho_1(k+1))^2 + \rho_2}{\rho_1\hat{\delta}_i(k+1)} < \frac{\gamma_i^{tar}}{p^{max}} \\ p_i(k) + \hat{\alpha}_i(k)e_i(k) & o.w. \end{cases}$$

where $\hat{\alpha}_i(k)$ is defined in the following equation:

$$\hat{\alpha}_i(k) = \begin{cases} \frac{1}{\hat{\delta}_i(k)}\left(1 - \frac{\gamma_i^{tar}}{e_i(k)}\right) + \frac{\rho_1\hat{\delta}_i(k+1)}{\rho_1(\hat{\delta}_i(k+1))^2 + \rho_2}\frac{\gamma_i^{tar}}{e_i(k)} & \text{if } e_i(k) \neq 0 \\ 0 & \text{if } e_i(k) + 0. \end{cases}$$

18. The system of claim 16 wherein said power change is transmitted from said base station to said mobile in a frame format on a downlink from said base station to said mobile.

* * * * *